Aug. 18, 1959 W. O. NORMANDIN 2,899,874
MANUFACTURE OF GUSSET TYPE ENVELOPES
Filed April 28, 1958 7 Sheets-Sheet 1
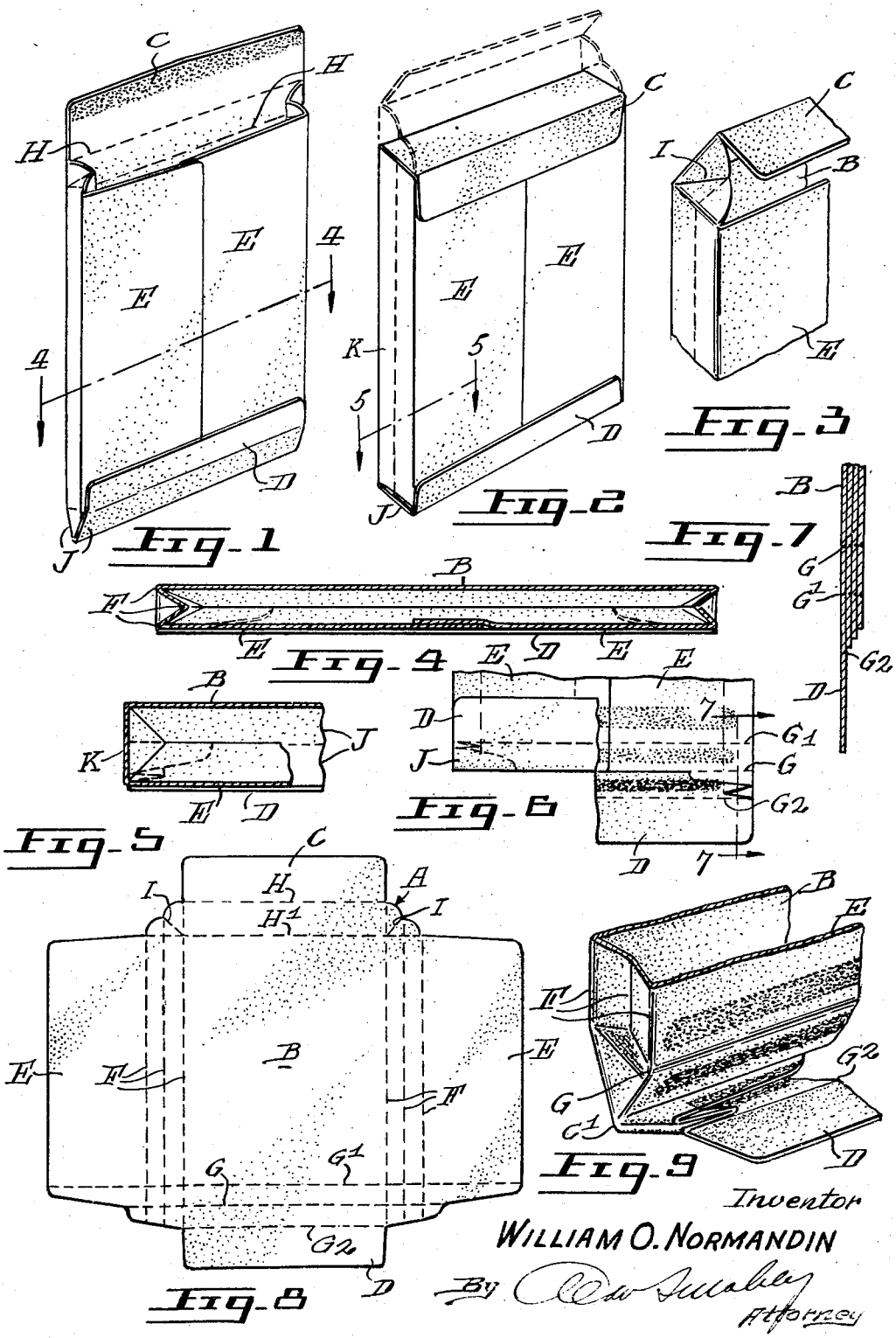
Inventor
WILLIAM O. NORMANDIN
By (signature)
Attorney Aug. 18, 1959 W. O. NORMANDIN 2,899,874
MANUFACTURE OF GUSSET TYPE ENVELOPES
Filed April 28, 1958 7 Sheets-Sheet 2
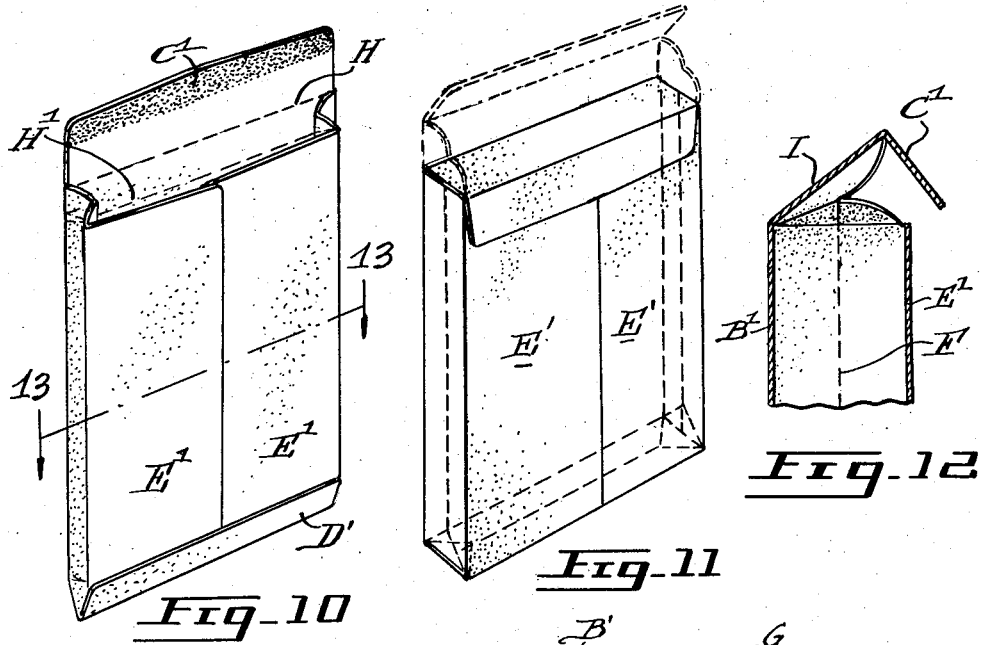
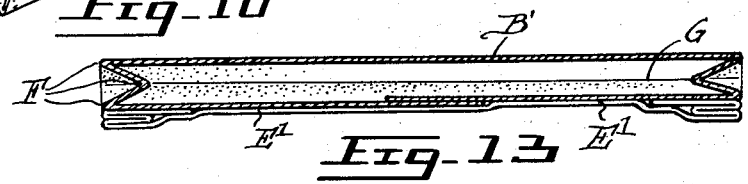
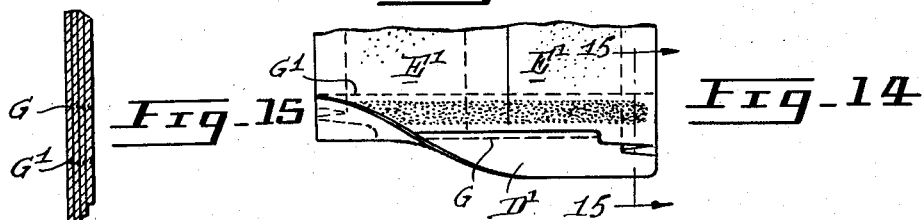
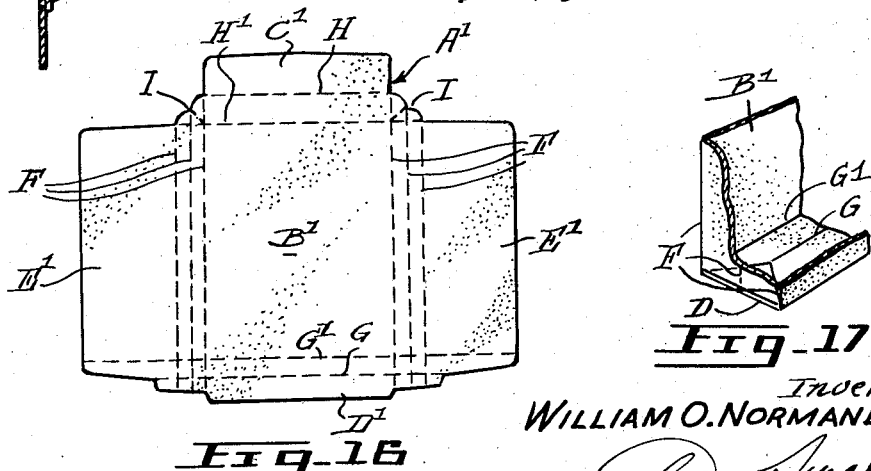
Inventor
WILLIAM O. NORMANDIN Aug. 18, 1959  W. O. NORMANDIN  2,899,874
MANUFACTURE OF GUSSET TYPE ENVELOPES
Filed April 28, 1958  7 Sheets-Sheet 3
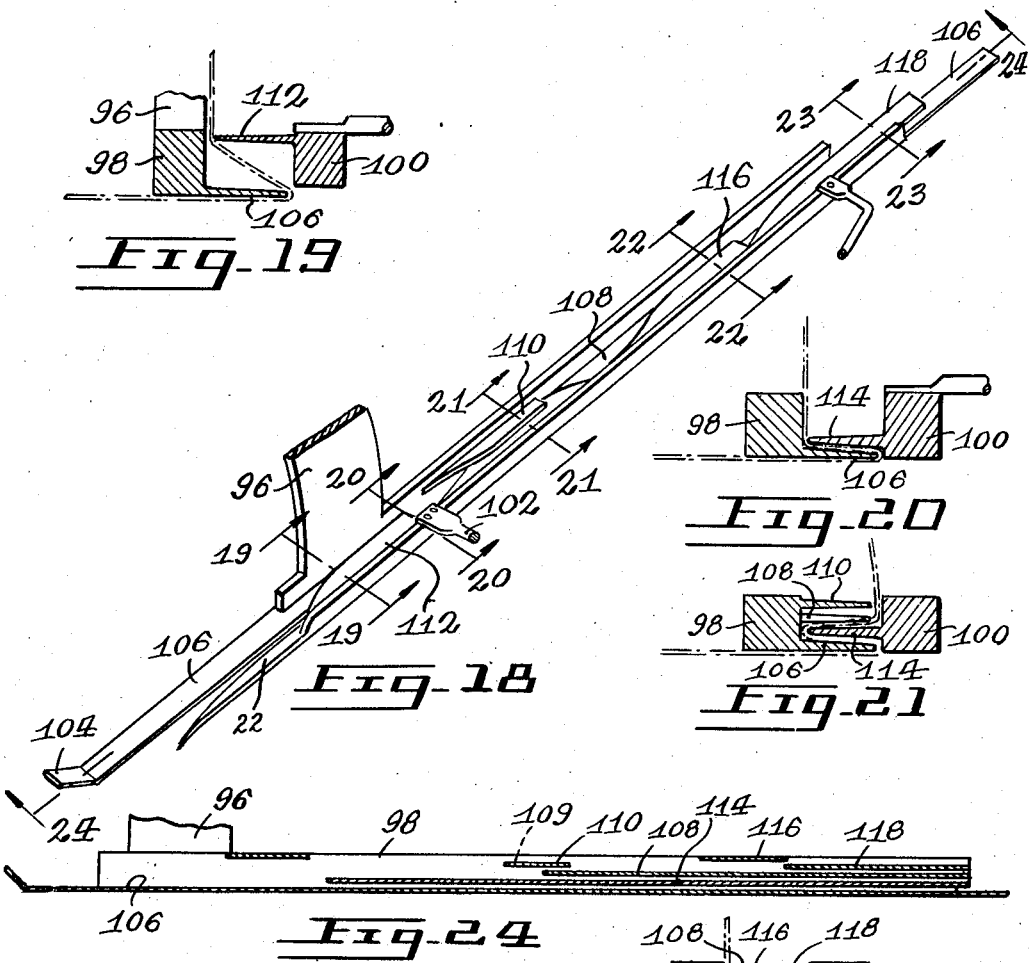
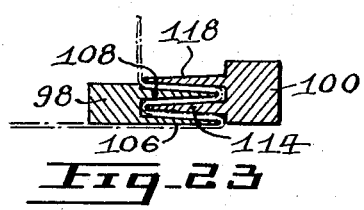
Inventor
WILLIAM O. NORMANDIN
By
Attorney

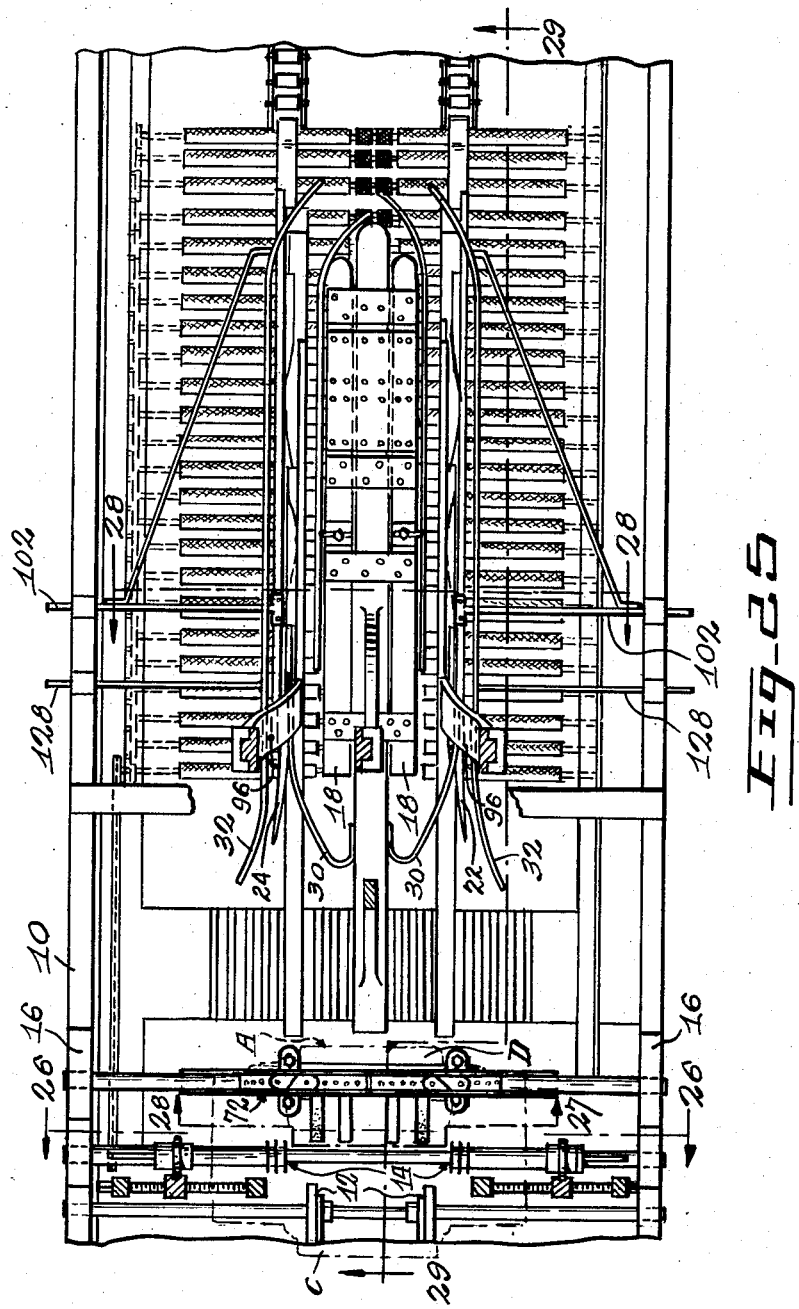

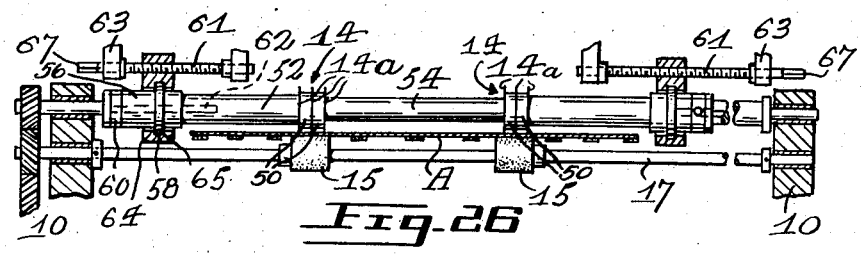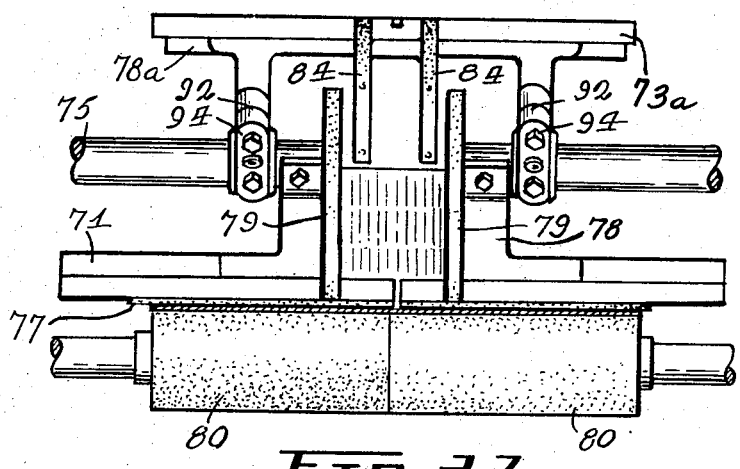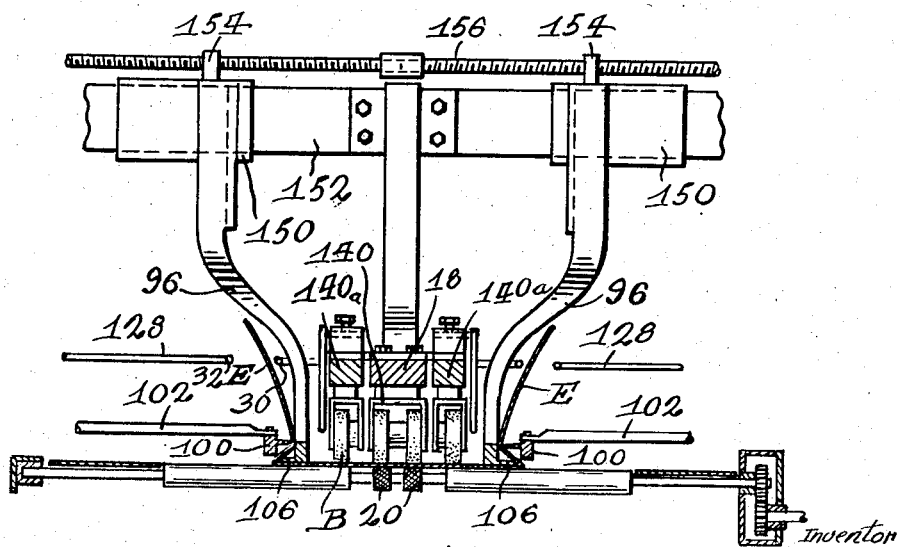

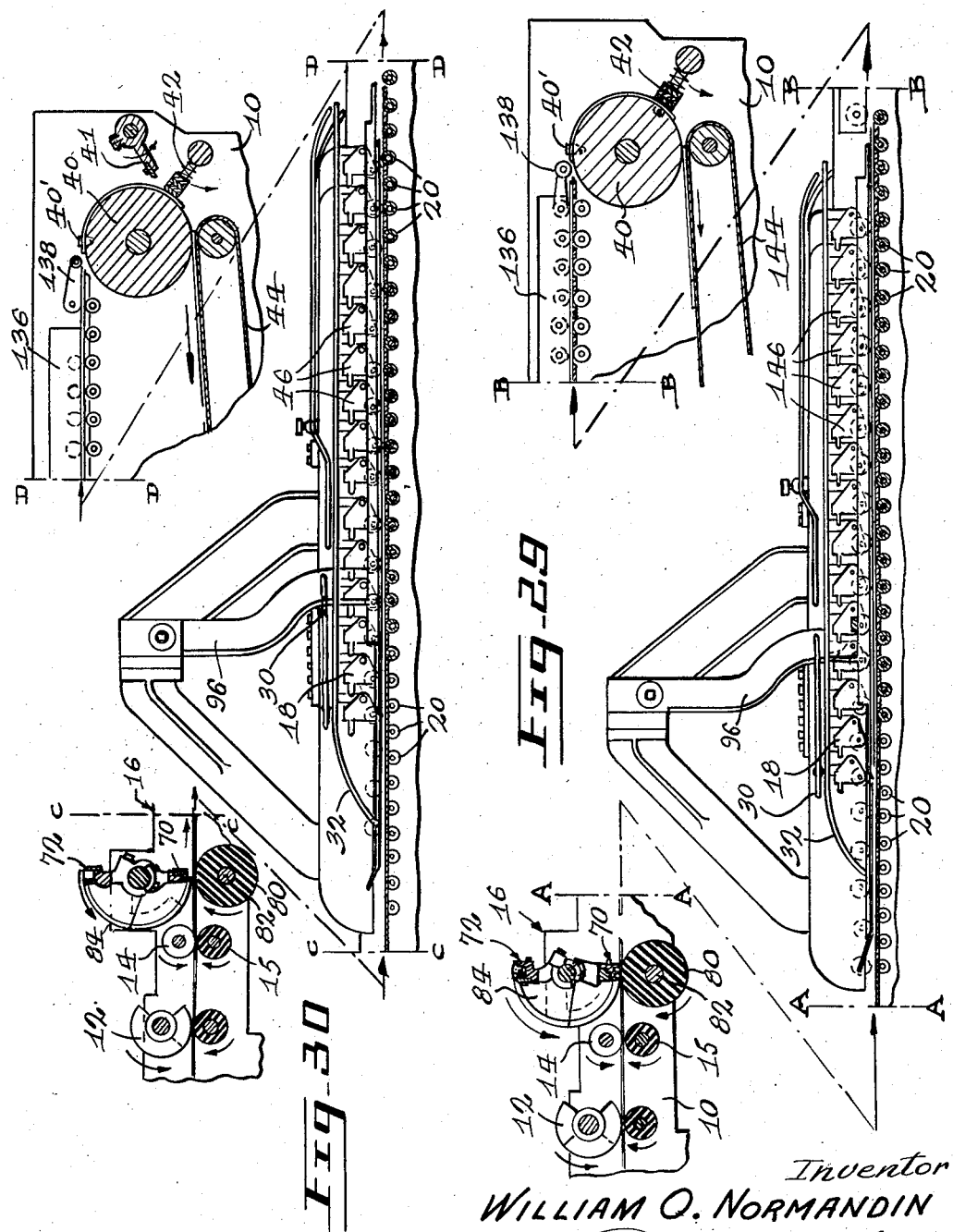

Aug. 18, 1959     W. O. NORMANDIN     2,899,874
MANUFACTURE OF GUSSET TYPE ENVELOPES
Filed April 28, 1958     7 Sheets-Sheet 7
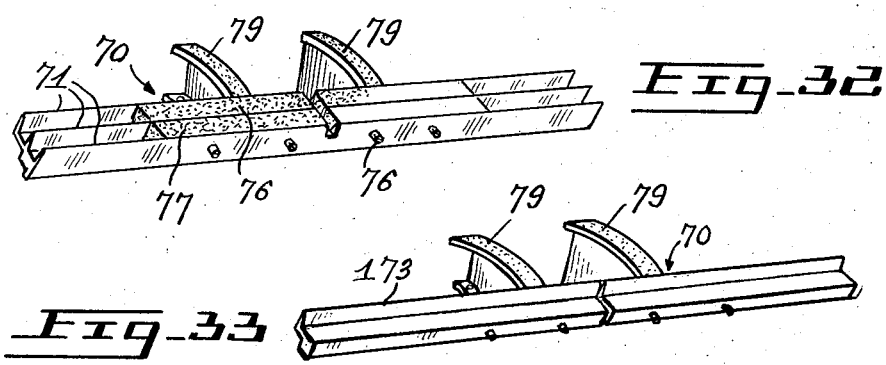
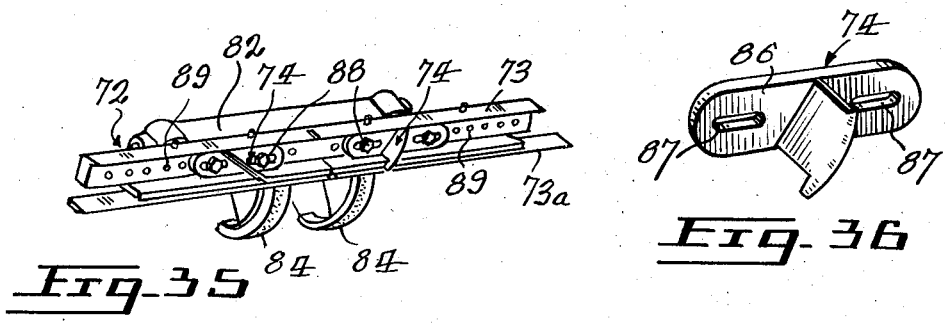
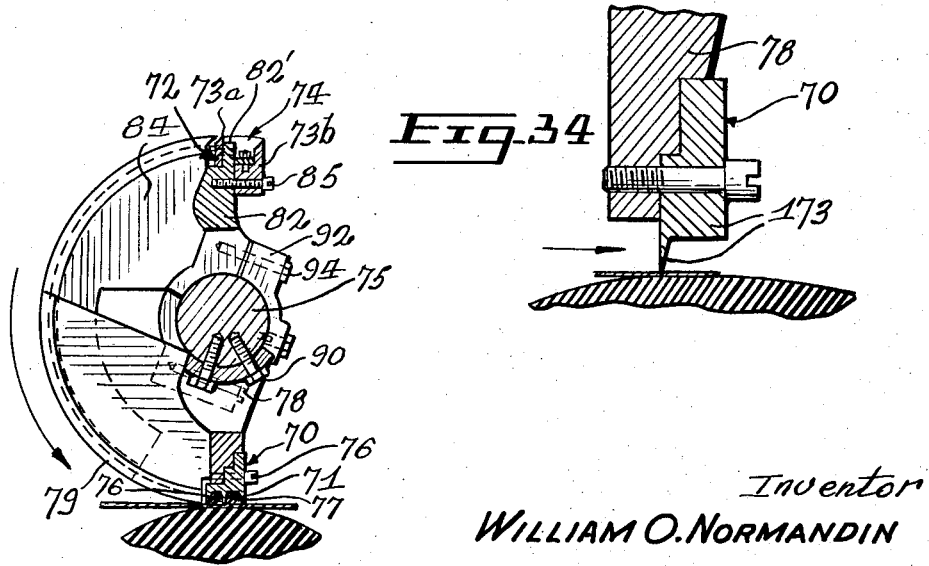
Inventor
WILLIAM O. NORMANDIN
By *Alan Ainsley*
Attorney United States Patent Office 2,899,874
Patented Aug. 18, 1959

2,899,874

MANUFACTURE OF GUSSET TYPE ENVELOPES

William O. Normandin, Montreal, Quebec, Canada

Application April 28, 1958, Serial No. 731,414

28 Claims. (Cl. 93—62)

The present invention relates to improvements in envelope-making machines and more particularly to apparatus whereby a standard envelope-making machine can be modified to continuously produce gusset-type envelopes.

At the present time gusset-type envelopes are mainly made by hand, which of course makes the production cost and labour involved considerable.

In accordance with the present invention, there are certain additions and modifications made to the existing mechanism of an envelope machine whereby envelope blanks are completely creased, folded and adhesively secured in a continuous line sequence to produce gusset-type envelopes.

With the present apparatus it is possible, with the use of envelope blanks designed particularly for the purpose, to produce automatically and in production quantities gusset-type envelopes of any required size. These can be made, with the appropriate blanks, as having fully expansible side flaps and bottoms, and overlapping top flaps including end sealing gussets.

More specifically, the invention is embodied in an envelope-making machine having a main frame and envelope conveying means on the frame adapted to convey envelope blanks in a continuous sequence in a circuitous path through the machine in envelope folding sequence. The type of envelope blanks used to make up gusset type expansible envelopes in accordance with the invention include a main front panel portion with integral top and bottom flap portions extending from the front panel portion, and side flap portions extending from each side of the panel portion transversely to the top and bottom flaps.

In accordance with the invention a first adjustable scoring means is mounted on the frame and is adapted to triple score the blank side flap portions at each side of the front panel in alignment with the conveying direction. A second adjustable scoring means is mounted on the frame adapted to score the blank adjacent to the juncture of the bottom flap of the main panel transversely of the conveying direction and also score the top flap adjacent the juncture with the front panel and transversely to the conveying direction. A pair of opposed folding blade sets are mounted on the frame at each side of the conveying means path adapted to fold the triple scored side flap portions inwardly, outwardly, and inwardly in sequence to produce a double fold at each side of the blank. Opposed blank flap guiding bars are mounted on the frame adjacent to and adapted to cooperate with the first named folding bars to guide the travel of the free portions of the side flaps in a substantially vertical position as they pass through the folding blades into overlapped position with the main panel. Means are also provided on the frame to fold over the bottom flap of the envelope transversely to the conveying direction.

These various means are arranged so that the first and second scoring means, folding blade sets, flap guiding bars and final folding means are disposed on the frame in spaced apart sequence along the blank conveying path so that as the blank proceeds it is continuously and in sequence scored and folded to produce a finished gusset-type expansible envelope. The usual type of adhesive applying means are provided on the apparatus so as to apply adhesive on the bottom and top flap portions and at least one of the overlapping portions of the side flaps as the blanks proceed along the conveying path.

The present application is a continuation-in-part of United States application, Serial No. 618,828, filed October 29, 1956.

Having thus generally described the nature of the invention, particular reference will be made to the accompanying drawings, wherein there is shown by way of illustration a preferred embodiment thereof, and in which:

Figure 1 is a view in perspective elevation of a preferred form of gusset-type envelope having fully expansible side and bottom portions as may be produced by the apparatus of the invention.

Figure 2 is a further view in perspective elevation of the envelope construction of Figure 1 as it would appear when fully opened with the top flap shown fully closed in solid lines and partially open in broken lines.

Figure 3 is a partial view in perspective elevation of one top corner of the envelope construction of Figure 1 to show the folding of the top flap gusset.

Figure 4 is a cross-sectional view of the envelope construction of Figure 1 along the line 4—4.

Figure 5 is a cross-sectional view of the construction shown in Figure 2 along the line 5—5 to illustrate the relative positions of the blank portions forming the bottom of the envelope.

Figure 6 is an enlarged front view of the bottom portion of the envelope shown in Figure 1 with the outer bottom flap partially opened to show the arrangement of the side gusset folds prior to the final folding in.

Figure 7 is a cross-sectional view of Figure 6 along the line 7—7 to illustrate the disposition of the side gusset folds and bottom flap.

Figure 8 is a view in plan of a flat blank required to produce a gusset envelope of the type shown in Figure 1 with the various fold lines indicated in broken lines.

Figure 9 is an enlarged view in perspective elevation of a bottom corner of the envelope construction of Figure 1 to show more clearly the folding of the side gusset folds and bottom portion flap with the envelope partially expanded and the bottom flap unsealed.

Figure 10 is a view in perspective elevation of an alternative preferred form of gusset type envelope having a slightly different expansible bottom portion as may be produced by the apparatus of the invention.

Figure 11 is a further view in perspective elevation of the envelope construction of Figure 10 at it would appear when fully opened with the top flap shown fully closed in solid lines and partially open in broken lines.

Figure 12 is a partial section of one top corner of the envelope construction of Figure 10 to show the inward folding of the top flap gusset.

Figure 13 is a cross-sectional view of Figure 10 along the line 10—10.

Figure 14 is an enlarged front view of the bottom portion of the envelope shown in Figure 10 with the outer bottom flap partially unfolded to show the position of the side gusset fold extensions prior to the final folding in.

Figure 16 is a cross-sectional view of Figure 14 along the line 15—15.

Figure 16 is a view in plan of a flat blank required to produce a gusset envelope of the type shown in Figure 10.

Figure 17 is an enlarged fragmentary view in perspective elevation of one bottom corner of the envelope construction shown in Figure 10 as it would appear in full open condition.

Figure 18 is a diagrammatic view in perspective elevation of one of the folding blade sets adapted to produce the double fold at each side of the blanks.

Figure 19 is a cross-sectional view of the blade structure shown in Figure 18, along the line 19—19 to show the first action of the first folding blade portion encountered.

Figure 20 is a cross-sectional view of Figure 18 along the line 20—20 to show the second action of the folding blades.

Figure 21 is a cross-sectional view of Figure 18 along the line 21—21 to show the action of the further folding blade portion creating the second fold.

Figure 22 is a cross-sectional view of Figure 18 along the line 22—22 to show the folding blade portions as they proceed to make the third fold.

Figure 23 is a cross-sectional view of the blade structure shown in Figure 18, along the line 23—23 to show the last action of the folding blades in setting the double fold at the side of the envelope.

Figure 24 is a cross-sectional view of the blade construction shown in Figure 18 along the line 24—24 to show the relative position of the interleaving blade portions.

Figure 25 is a plan view of a major portion of the upper portion of an envelope machine embodying the present invention to show the relative position of the attachments making it possible to automatically produce gusset-type expansible envelopes.

Figure 26 is a sectional view of a portion of the machine as illustrated in plan in Figure 25, and along the line 26—26 to show the first scoring rollers adapted to triple score the blanks along each side to form the expansible gusset flaps and the manner in which they are mounted for adjustable setting to suit blanks of varying dimensions.

Figure 27 is a further sectional view of the machine as illustrated in plan in Figure 25, and along line 27—27 to illustrate more clearly the mounting and arrangement of the scoring blades adapted to score the blank at top and bottom transversely of the conveying direction.

Figure 28 is a still further sectional view of the machine as illustrated in plan in Figure 25, and along the line 28—28, to illustrate the arrangement of the front of the top carriage, the upper guiding and lower driving rollers of the conveying arrangement, the adjustable mounting for the side folding blade sets, and the relative position of the envelope side flap guiding bars.

Figure 29 is a longitudinal cross-sectional view of the machine construction shown in Figure 25, substantially along the line 29—29 and including a section of the end conveyor roller and folding arrangement beyond the end of the showing of Figure 18, to illustrate more clearly the relative position of the scoring and folding blades, together with the top guiding bars and guide carriage by means of which the envelope construction of Figures 1 through 9 is made.

Figure 30 is a longitudinal cross-sectional view corresponding in location and general assembly to the construction shown in Figure 29 with some modification to the transverse scoring blades at the second scoring station and the addition of a further transverse scoring blade at the end of the conveying rollers by means of which the envelope construction of Figures 10 through 17 can be made.

Figure 31 is an enlarged detail view in section of the transverse scoring blade assembly of Figure 29 to illustrate in more detail the adjustable mounting and construction.

Figure 32 is an enlarged detail view in perspective elevation of a segment of the scoring blade assembly of Figures 29 and 31 to illustrate more clearly the triple scoring blades and their mounting relative to the arcuate feeder segment.

Figure 33 is an enlarged detail view in perspective elevation of a segment of the scoring blade assembly of Figure 30 to illustrate the single scoring blade and its mounting relative to the arcuate feeder segment.

Figure 34 is an enlarged detail view in section of the transverse scoring blade assembly of Figure 30 to illustrate in more detail the adjustable mounting and construction.

Figure 35 is an enlarged detail view in perspective elevation of the common top transverse scoring blades of the constructions shown in Figures 29 and 30 to illustrate their mounting together with the adjustable diagonally scoring inset blades adapted to score the top flap gussets simultaneously with the scoring of the envelopes top flap.

Figure 36 is an enlarged detail view of one of the adjustable diagonally scoring inset blades adapted to score the top flap gussets.

With particular reference to Figures 1 through 9, a preferred form of the type of envelope with which the present invention is concerned is shown in blank form in Figure 8 and in made-up form in Figure 1. The blank A has a first portion B which will constitute the front panel of the envelope, top C and bottom D flap portions which will form the top flap and bottom closure flap respectively, and side flap portions E which when folded over will form the back panel of the envelope. The triple score lines indicated at F on each side of the blank central portion show the fold lines for the double gusset fold at the sides of the envelope. These fold lines extend the full length of the blank so as to permit the folding of the expansible bottom panel as will be described later. The triple scores G, G¹, G² along the bottom flap are to set the folding of the bottom flap D over the overlapping side flaps E and the double score H, H¹ setting the double fold for the top flap C. The diagonal score lines I are to set the top flap side flaps for eventual folding inwards when the envelope is fully expanded and sealed.

The distance between the score lines G, G¹ and G² is substantially half the full extended width of the double gusset sides so that when the envelope is fully extended the bottom portion J, see Figure 2, is equal to the open width of the side gussets K. The transverse scores G, G¹, and G², H, H¹ and the diagonal scores I are made directly after the longitudinal triple scores F and during the initial passage of the blank prior to its engagement by the main folding arrangement of the invention as will be described in more detail later.

A slightly modified form of envelope and blank is shown in Figures 10 through 17 wherein Figure 16 illustrates the blank from which the gusset envelope of Figure 10 is made. The blank A¹ has portions B¹, C¹ and D¹ making up the front panel and top and bottom flaps respectively and flap portions E¹ which when folded over form the back panel of the envelope. The necessary score lines are indicated to correspond with the fold lines of the construction of Figure 1, the main difference being that there are only two score lines G, G¹, as the bottom of this envelope does not include the full overlapping flap as provided in the first construction shown. Further, the second score line G¹ is made at the end of the folding operation as will be described in more detail later.

The preceding description is for the purpose of identifying the various parts and fold lines of the blanks A, A¹, designed for automatic manufacture by the apparatus of the invention, when describing the operation of the machine elements in accordance with the invention.

With particular reference to Figures 25, 29 and 30, the type of machine wherein the present invention is embodied is known generally as "an open end automatic envelope machine" and the general overall construction is well known and need not be described in detail at the present time. Essentially, such a machine includes a main frame 10 and conveying means are provided on the frame whereby standard "open end" envelope blanks are continuously fed into and along a circuitous path while being subjected to sequential scoring, folding and adhesive applying apparatus to produce the finished envelopes.

Since the present invention is concerned only with improvements and additions to the scoring and folding arrangements of a machine of this type a portion of the top run of the machine only is illustrated.

As the operations to the blank A or $A^1$ are the same up to the final folding step the following description will refer only to the blanks A, it being understood that where there is a variation this will be specially mentioned in connection with the blank $A^1$.

General arrangement

In Figure 25 the top portion of the frame 10 is shown with the envelope blanks A being fed along the frame by an intermittent blank feeding roll segment arrangement 12 and into and through a first set of spaced apart rotary scoring disk assemblies 14 which are adapted to provide the triple score lines F along each side of the blank as it proceeds. The continued advance of the blank A brings it into and through the combined double and triple scoring roller assembly 16 which provides the triple transverse scores G, $G^1$, $G^2$, the double score lines H, $H^1$ across the width of the blank, and the diagonal score lines I across the top flap gussets. This is accomplished in sequence by the scoring blade assembly 16 as will be described in more detail later. It should be mentioned that the blank A is fed through the machine with the bottom flap D leading.

The scored blank is then fed into and between the top blank guiding carriage 18 and the opposed sets of knurled driving rollers 20 so that as it advances the side flaps E are first lifted into a vertical position and the double side folds forming the expansion gussets formed in sequence by passing through opposed sets of folding blades 22, 24. The sequence of the right-hand folding along the score lines F by the folding blade set 22 is shown in Figures 19 through 23, the operation of the left-hand set 24 being identical. During this folding operation the free ends of the flaps E are guided by contact with opposed guide bars 30, 32 so that after the side folds have been completed and set by the blades 22, 24, the side flaps E are folded over in overlapped relationship on top of the front panel B. Since adhesive was previously applied by adhesive applying rollers (not illustrated) the semi-finished blank A proceeds to the end of the top run of the machine where it is transmitted about a guide roller 40 and into and between a pressure bar 42 which acts in combination with the standard folding fingers to fold over and secure the previously adhesively coated bottom flap D. From the pressure bar 42 the envelope is transmitted to a conveyor 44 and back along the machine for the usual adhesive drying operation.

In the treatment of the blank $A^1$ only a single score $G^1$ is made by the scoring roller assembly 16 which is modified accordingly as shown in Figure 30, and simultaneously with the folding up of the bottom flap D and previous to the final passing between the pressure bar 42 and the roller 40, a scoring blade 41 mounted on a shaft 43 is actuated into contact with the completely folded envelope to make the final score line G. The score line G on the blank $A^1$ is in line with the juncture of the bottom flap D and the panels E and is made through all the layers of the side gussets, see Figures 14 and 15, making it possible to extend the bottom of the envelope to the full width of the side gussets when extended, see Figure 17.

The improved scoring and folding elements with which the present invention is concerned will now be described in more detail.

Side flap scoring disks (triple scoring)

With particular reference to Figures 25, 26, 30 and 31, the rotary scoring disk assemblies 14 are shown in opposed relationship with a spaced pair of pressure rollers 15 having at least a covering of resilient material to receive the spaced apart scoring disks 14a.

In the construction shown there are two spaced apart scoring disk assemblies 14 each made up of three (3) spaced apart scoring disks 14a with spacing collars 50 therebetween. These in turn are mounted on hollow sleeves 52 which are mounted on a main shaft 54 extending across the width of the machine frame 10. Collars 56 having an outstanding annular flange 58 are mounted on the ends of the sleeves 52 remote from the disk assemblies 14. Each of the collars 56 is provided with a key or pin 60 which slidably fits through a corresponding keyway 62 provided at each end of the shaft 54 so that rotation of the shaft 54 is transmitted to the disk assemblies 14. The spacing between the disk assemblies 14, to suit different sizes of envelopes, is varied as desired by the following arrangement: An elongated threaded shaft 61 is mounted between supporting blocks 63 at each side of the frame 10 above the shaft 54. A split collar 64 is threadably engaged with each of the shafts 61 and surrounds and engages the collars 56. The interior of the split collars 64 is grooved as indicated at 65 so as to accommodate the outstanding flange 58 of the collars 56 for free rotation. With this arrangement, rotation of the shafts 61, which are each provided with a slotted or squared end 67 for this purpose, causes a corresponding inward or outward movement of the split collars 64 and consequently the scoring disk assemblies 14 towards and away from each other. The pressure rollers 15 beneath the assemblies 14 are mounted on a common shaft 17 which is driven in counter rotation and in sequence with the shaft 54.

Transverse scoring blade assemblies

From the triple scoring operation of the side flap scoring disks the blank is conveyed beneath the scoring roller assembly 16. In the known constructions utilized for making standard open end envelopes, this roller usually has two (2) single scoring blades disposed in circumferentially spaced apart relationship, one to score or crease the bottom flap of the blank, and one to score the top flap. In the constructions presently illustrated, and first with particular reference to Figures 25, 27, 29 and 31, a first scoring unit 70 having three (3) spaced apart scoring blades 71 is provided which is adapted to score or crease the lines G, $G^1$ and $G^2$ across the full width of the blank and a further set 72 of two (2) spaced apart scoring blades 73 is also provided which is adapted to score the lines H, $H^1$ along the top flap as the blank proceeds. Mounted between the blades 73 is a pair of opposed diagonal scoring blades 74 adapted to make the score lines I, I on the top flap gussets simultaneously with the scoring action of the transverse blades 73.

With particular reference to Figures 29, 31, 32 and 35 illustrating the scoring blade arrangements utilized in the scoring of the envelope blank A, the scoring blade set 70 is mounted on a supporting body 78 provided with spaced apart arcuate feeding segments 79. The blade set 70 is made as a single unit having three integral blades 71 in regularly spaced apart relationship with resilient strips 77 mounted between the blades to aid in the feeding of the blank in co-operation with the bottom pressure roller 80. The blade set 70, as shown most clearly in Figure 31, is attached to the body 78 by suitable screws or bolts 76 so that other similar blade sets having different blade settings can be alternatively attached if required to suit varying types of bottom gussets and envelope sizes.

The blade set 72 is mounted on a similar supporting body 82 which is provided with spaced apart arcuate feeding segments 84. As is shown most clearly in Figures 35 and 36, the blade 73a is secured directly to the top surface of the extension 82¹ of the body 82 while the blade 73b is secured by bolts 85 to the front face of the body extension 82¹. Accordingly, as with the blade set 70 other similar blade sets having different blade settings can be alternatively attached to the body 82. The opposed diagonally placed scoring blades 74 are also capable of adjustment relative to each other to suit varying envelope sizes. Each blade 74 is provided with a base portion 86 having elongated attachment slots 87 and the blade 73b, to which the blades 74 are attached by suitable screws 88, includes a plurality of tapped openings 89 along its length (see Figures 35, 36).

In order to provide for adjustment in the circumferential spacing between the blade sets 70, 72, to give the desired spacing between the scoring of the top and bottom of the blank A, the blade supporting body 78 is mounted on and is secured by screws 90 to the shaft 75 while the supporting body 82 is mounted on the shaft 75 so as to be capable of rotary adjustment about the shaft. For this purpose the body 82 is provided with split collars 92 at each end which are joined by screws 94 so that when the blade set 70 is at the correct circumferential spacing relative to the blade set 72 the supporting body 82 can be secured to the shaft 75. The shaft 75 of course is driven in sequence with the feeding rollers 10 and the scoring disk assemblies 14.

With particular reference to Figures 29 and 31, it should be mentioned that the arcuate segments 84 are located between the corresponding arcuate segments 79 of the body 78 and are of sufficient circumferential length so that the combined segments provide a complete arcuate feeding member which together with the resilient strips 77 between the blades 71 act in combination with the bottom pressure roller 80 to positively feed the blank forward between the spaced apart scoring blade sets. The pressure roller 80 is mounted on a shaft 83 extending across the machine frame 10 and is driven in counter rotation and in sequence with the shaft 75. With particular reference to Figures 30, 33 and 34, the scoring blade arrangements described are varied slightly in the arrangement utilized to make up envelopes from the alternative blank form A¹.

While the blade set 72 remains the same, a single blade only 173 is provided on the blade set 70 mounted on the supporting body 82. This blade is adapted to score the score line G¹ on the blank A¹ with the score line G being made at the end of the folding operation as will be described later. Otherwise, the arrangement and function of the transverse scoring blades are the same as described for the preferred blank form A.

As the blank A or A¹ is fed from engagement with the second blade set 72, the lengthwise scored side flaps E, by contact with the entry portion of the guide bars 30, 32 and the folding blades 22, 24, are being gradually folded up to a substantially vertical position.

*Side gusset folding blades and flap guiding bars*

The scored and creased blank then proceeds into engagement with the first portion of the opposed pairs of folding blade sets 22, 24 which in accordance with the present invention each comprise of matched pairs of gusset folding blades which are mounted to the frame 10 and supporting standards 96 in the conveying path of the envelope blanks. Since the blade sets 22, 24 are identical except for being made for opposite sides we shall describe only the right-hand set 22 in detail with specific reference to Figures 18 through 23.

The folding blade set 22 comprises of a pair of opposed spaced apart parallel guide and folding blade members 98, 100. The inner member 98 is connected to and supported by the right-hand standard 96 while the outer member 100 is connected to and supported by adjustable supporting rods 102 which engage with and are supported by the frame 10 as will be described in more detail later.

The folding member 98 is provided with a front shoe or upturned portion 104 which engages the portion of the blank adjacent the score lines F and a first lower folding blade portion 106 which extends the length of the member. A second blade portion 108 is positioned above and in parallel spaced apart relationship with the blade portion 106 from the point indicated at 109 in Figure 24 to the end of the member. A third and fold over blade portion 110 is positioned slightly above the blade portion 108 with the leading edge slightly in advance of the leading edge of the blade portion 108.

The folding member 100 is provided with a first fold over blade portion 112 which co-operates with the blade portion 106 on the member 98 to fold the first gusset fold L along the score lines F (see Figure 19). A second blade portion 114 is provided on the member 100 which extends from slightly in advance of and beneath the blade portion 112 to the end of the member.

The blade portion 114 is interleaved between the blade portions 106 and 108 of the member 98 so that once the flap E has been initially deflected by the blade portion 112 to form the first fold this fold follows between and is set by the blade portions 106 and 114 (see Figure 20).

A further fold over blade portion 116 is provided on the member 100 in substantial alignment with the fold over blade portion 112, and considerably in advance of the fold over blade portion 110 of the member 98. A final blade portion 118 is provided on the member 100 slightly beneath and in advance of the fold over blade portion 116 to extend to the end of the member. The blade portion 108 of the member 98 is interleaved between the blade portions 114 and 118 of the member 100. The continued advance of the blank from the blade portions shown in Figure 20 brings the flap E of the blank into contact with the blade portion 110 to make the fold shown in Figure 21 which is then set by the blade portion 108 as shown in Figure 22. The continued advance of the blank brings the flap E into contact with the fold over blade portion 116 of the member 100 so as to make the final fold as also shown in Figure 23. Finally the flap E contacts the blade portion 118 of the member 100 which sets the last fold of the gusset.

As will be seen by reference to the drawings, the various folding blade portions are appropriately contoured to encounter and guide the leading edge of the flap E as it proceeds in substantially upright position between the folding blades as described. A further guide and control of the movement of the flaps is provided by the guide bars 30, 32 with the guide bars 32 adjustably mounted at each side of the frame 10 by supporting rods 128 and the guide bars 30 being adjustably mounted at each side of the roller blank guide carriage 18. The guide bars 30 and 32 are shaped and disposed in spaced apart pairs in alignment with the travel of the blank flaps E so as to maintain the flaps E in substantially upright or vertical position for most of the travel through the folding blade sets 22, 24 and finally cause the flaps E of the moving blank to fold in with the right-hand flap overlapping the left-hand flap.

It should be mentioned that prior to this interfolding of the side flaps adhesive is applied. Actually in the standard machines of this type the adhesive would be applied before the side flaps E are raised to the vertical position and since they are maintained in this position throughout the side gusset folding operation there is no chance of the adhesively coated edges coming in contact before they are folded one on top of the other.

Prior to the final pressing flat of the overlapped side flaps E the now folded side gusset portions of the blank pass under a further set of pressure leaves 136, shown partially in the right-hand portion of Figure 29, which flatten the side folds in the gussets so that the flaps are set in substantially flat condition before passing under a set of rollers 138, also shown in Figure 29, which press the overlapped and adhesively coated portions of the flaps together.

Blank guiding carriage and driving rollers

Since the frictional resistance encountered by the blank during the folding in of the side gussets by the folding blade arrangements described is considerably greater than that encountered by a standard single folded envelope blank, it is necessary to modify the blank guiding carriage 18 and opposed knurled driving rolls 20 to overcome this increased frictional drag.

This is accomplished in accordance with the construction illustrated by increasing the number of guide roller units 146 on the carriage 18 and providing additional sets of driven knurled rollers 20 on the frame 10. The modification necessary for the addition of supplementary drive rollers 20 to a standard machine is slight and if it is desired to use a machine so modified for the manufacture of standard envelopes the supplementary knurled drive rollers 20 need not be removed as they improve the drive for any type blank.

The carriage 18 is modified in accordance with the invention so that the outside sets of guide rollers 146a can be removed or alternatively, and preferably, if it is desired to return the machine to the usual construction the carriage 18 can be removed and replaced by a standard carriage.

As previously mentioned, the inner member 98 of the folding blade set 22 is mounted on the right-hand standard 96 while the corresponding member 98 of the blade set 24 is mounted on the left-hand standard 96, see Figure 28. The standards 96 are adjustable relative to the carriage 18 so that the spacing therebetween may be varied to set the folding blade sets 22, 24 in the desired spaced apart relationship for varying sizes of envelope blanks. This adjustment is made possible by having the upper ends of the standards 96 connected to slide blocks 150 which are slidably mounted on a transverse supporting bar 152 extending across the top of the machine frame 10. Threaded blocks 154 extending from the top of the slide blocks 150 are threadably engaged with a threaded shaft 156. The shaft 156 and blocks 154 are threaded in opposite directions so that rotation of the shaft 156 causes equal movement of the standards 90 towards and away from each other.

Bottom flap folding

From the flattening and adhesively securing of the overlapping flaps E of the blank A the partially finished envelope proceeds about the guide roller 40, see Figure 29, and as previously mentioned into contact with the rocker actuated pressure arm 42 which acts in combination with the standard folding fingers (not illustrated) to fold over and secure the bottom flap D with the terminal portion overlapping the back panel flaps E. Immediately before this operation adhesive is applied to the semi-finished envelope, see Figures 6 and 7, along the face of the overlapped flaps E and the inner face of the bottom flap D. This adhesive applying operation is performed by the usual and known adhesive applying means (not illustrated) on machines of this type. At this point the blank is retained by the standard side grippers, indicated generally at 40¹ on Figure 29, also provided on machines of this type. These grippers 40¹ are narrow strips mounted so as to at least partially surround the roller 40 to hold the blank at each side, retaining the side portions against displacement as the bottom flap D is folded up by the standard folding fingers (not illustrated). The rocker actuated pressure arm 42 is then brought into contact with the folded over flap D, pressing it firmly against the body of the envelope and ensuring the adhesive attachment.

As shown in Figure 30, the envelope blank A¹, due to the difference in the bottom flap arrangement, is correspondingly retained at this point by the grippers 40¹ and the additional scoring blade 41 is actuated into contact with the blank along the juncture of the flap D to make the final score G prior to the final folding up of the flap D by the standard folding fingers and the final flattening of all folds by the pressure bar 42. The means for actuating the pressure bar 42 is accomplished by known standard mechanisms provided in a machine of this type, the only difference being that the bar 42 must be made more substantial than is usually required to apply the additional pressure required in consequence of the multiple folds made by the side gussets of the pressure envelope constructions.

From the rocker bar 42 the finished envelopes then proceed back along the machine on the conveyor belt 44 to a point where adhesive is applied to the top flaps C by conventional adhesive applying means (not illustrated). This last adhesive is of the type which is allowed to dry on the flap C and which is moistened when required for subsequent sealing of the envelopes. The envelopes then proceed along a circuitous path about the machine frame for the drying of the adhesive and is finally discharged and stacked in the usual and well known manner.

It will be appreciated that by the additions and modifications made according to the invention to a standard automatic envelope machine and by use of the envelope blanks illustrated it is possible to produce completed gusset type envelopes automatically and in production quantities previously not possible. The complete elimination of the usual manual folding and finishing of this type of envelope results in a considerable saving in time and labour and consequently reduces the cost of production.

I claim:
1. As an attachment to a standard open end envelope machine having a supporting frame, a continuous conveyor mounted on and adapted to convey envelope blanks along the length of said frame, and adhesive applying means mounted on said frame in the path of said conveyor; scoring and folding apparatus adapted to score and fold suitable blanks into gusset type expansible envelopes and comprising; a first scoring roller assembly having a pair of axially spaced apart sets of three scoring disks adapted for mounting on said frame transversely to and at each side of said machine conveyor with said disks in alignment with the feeding direction of said conveyor, a second scoring roller assembly spaced from said first roller assembly and having a plurality of circumferentially spaced apart scoring blades adapted for mounting on said frame in spaced relationship in the feeding direction of the conveyor from said first scoring roller assembly with said scoring blades disposed transversely to the path of said conveyor, a pair of opposed folding blade sets adapted for mounting on said frame at each side of and in alignment with the path of said conveyor and spaced from said first and second scoring roller assemblies, each of said blade sets having a plurality of opposed sequential folding blades disposed in staggered relationsip one above the other.

2. An attachment as claimed in claim 1, wherein said circumferentially spaced apart scoring blades are arranged in two sets, one of said sets having a pair of opposed scoring blades, the other of said sets having three spaced apart scoring blades.

3. As an attachment to a standard open end envelope machine having a supporting frame, a continuous conveyor mounted on and adapted to convey envelope blanks along the length of said frame, and adhesive applying means mounted on said frame along the path of said conveyor; scoring and folding apparatus adapted to score and fold blanks into gusset-type envelopes and comprising; a first scoring roller having a pair of axially spaced apart sets of three scoring disks adapted for mounting on said frame transversely and at each side of said conveyor with said disks in alignment with the direction of said conveyor, a second scoring roller spaced from said first roller and having three circumferentially spaced apart scoring blades adapted for mounting on said frame with said blades disposed transversely to said conveyor, a pair of opposed folding blade sets adapted for mounting on said frame at each side of and in alignment with the path of said conveyor, each of said blade sets having a plurality of opposed sequential folding blades disposed in staggered relationship one above the other, and a third scoring roller having a single scoring blade adapted for mounting on said frame transversely of and adjacent to one terminal end of the path of said conveyor.

4. An apparatus adapted to automatically fold and make up a gusset-type expansible envelope from an envelope blank having a front panel, integral top and bottom flap portions and side flap portions extending from each side of the front panel portion, and in combination with a standard automatic open end envelope machine having a supporting frame, a continuous conveyor adapted to convey said blanks along the length of said frame and adhesive applying means disposed on said frame along the length of said blank conveying path comprising; a first adjustable blank scoring means mounted on said machine frame across said conveyor and adapted to triple score said blank side flap portions at each side of said front panel in alignment with the conveying direction, a second adjustable scoring means mounted on said frame adapted to at least single score said blank adjacent the juncture of the bottom flap with the front panel and score the top flap adjacent the juncture with the front panel transversely to the path of said conveyor, a pair of spaced apart folding blade sets mounted on said frame at each side of said conveyor path adapted to fold said triple scored side flap portions inwardly, outwardly and inwardly in sequence to produce a double fold at each side of said blank, a pair of opposed blank guiding bars mounted on said frame and adapted to cooperate with said folding blade sets to guide the free portions of said blank side flaps in a substantially vertical position as they pass through said folding blade sets and finally guide said flaps into overlapped position on said blank front panel, said first and second scoring means, folding blade sets, and flap guiding bars being disposed in spaced apart sequence along the path of said blank conveyor whereby as said blank is conveyed along said frame it is continuously and in sequence scored and folded to produce a finished gusset-type expansible envelope.

5. An apparatus as claimed in claim 4, wherein said first scoring means comprises two spaced apart sets of three scoring disks mounted on a common shaft, adjustable means between said shaft and disks whereby the spacing between said opposed sets may be varied, a pressure roller having at least a coating of resilient material mounted in parallel alignment beneath and in engagement with said scoring disks.

6. An apparatus as claimed in claim 4, wherein said second scoring means comprises a pair of scoring blade supporting member of arcuate segmental conformation mounted on a common shaft, a set of three spaced apart scoring blades mounted on one of said supporting members in axial alignment with said shaft, a further pair of opposed scoring blades mounted in parallel spaced apart relationship on the other of said members and in axial alignment with said shaft, said supporting members being mounted for pivotal movement on said shaft whereby the circumferential spacing between said set of blades and pair of blades may be varied, and a pressure roller having at least a coating of resilient material mounted in parallel alignment beneath and in operative engagement with said scoring blades.

7. An apparatus adapted to automatically fold and make up a gusset-type expansible envelope from an envelope blank having a front panel, integral top and bottom flap portions and side flap portions extending from each side of the front panel portion, and in combination with a standard automatic open end envelope machine having a supporting frame, a continuous conveyor adapted to convey said blanks along the length of said frame and adhesive applying means disposed on said frame along the length of said blank conveying path; comprising; a first adjustable blank scoring means mounted on said machine frame across said conveyor and adapted to triple score said blank side flap portions at each side of said front panel in alignment with the conveying direction, a second adjustable scoring means mounted on said frame adapted to triple score said blank adjacent the juncture of the bottom flap with the front panel and double score the top flap adjacent the juncture with the front panel transversely to the path of said conveyor, a pair of spaced apart folding blade sets mounted on said frame at each side of said conveyor path adapted to fold said triple scored side flap portions inwardly, outwardly and inwardly in sequence to produce a double fold at each side of said blank, a pair of opposed blank guiding bars mounted on said frame and adapted to cooperate with said folding blade sets to guide the free portions of said blank side flaps in a substantially vertical position as they pass through said folding blade sets and finally guide said flaps into overlapped position on said blank front panel, said first and second scoring means, folding blade sets, and flap guiding bars being disposed in spaced apart sequence along the path of said blank conveyor whereby as said blank is conveyed along said frame it is continuously and in sequence scored and folded to produce a finished gusset-type expansible envelope.

8. An apparatus as claimed in claim 7, wherein said first scoring means comprising two spaced apart sets of three scoring disks mounted on a common shaft, adjustable means between said shaft and disks whereby the spacing between said opposed sets may be varied, a pressure roller having at least a coating of resilient material mounted in parallel alignment beneath and in engagement with said scoring disks.

9. An apparatus as claimed in claim 7, wherein said second scoring means comprises a pair of scoring blade supporting members of arcuate segmental conformation mounted on a common shaft, a set of three spaced apart scoring blades mounted on one of said supporting members in axial alignment with said shaft, a further pair of opposed scoring blades mounted in parallel spaced apart relationship on the other of said members and in axial alignment with said shaft, said supporting members being mounted for pivotal movement on said shaft whereby the circumferential spacing between said set of blades and pair of blades may be varied, and a pressure roller having at least a coating of resilient material mounted in parallel alignment beneath and in operative engagement with said scoring blades.

10. An apparatus adapted to automatically fold and make up a gusset-type expansible envelope from an envelope blank having a front panel, integral top and bottom flap portions and side flap portions extending from each side of the front panel portion, and in combination with a standard automatic open end envelope machine having a supporting frame, a continuous conveyor adapted to convey said blanks along the length of said frame and adhesive applying means disposed on said frame along the length of said blank conveying path comprising; a first adjustable blank scoring means mounted on said machine frame across said conveyor and adapted to triple score said blank side flap portions at each side of said front panel in alignment with the conveying direction, a second adjustable scoring means mounted on said frame adapted to triple score said blank adjacent the juncture of the bottom flap with the front panel and double score the top flap adjacent the juncture with the front panel transversely to the path of said conveyor, a pair of spaced apart folding blade sets mounted on said frame at each side of said conveyor path adapted to fold said double scored side flap portions inwardly, outwardly and inwardly in sequence to produce a double fold at each side of said blank, a pair of opposed blank guiding bars mounted on said frame and adapted to cooperate with said folding blade sets to guide the free portions of said blank side flaps in a substantially vertical position as they pass through said folding blade sets and finally guide said flaps into overlapped position on said blank front panel, and a third scoring means mounted on said frame transversely to said conveyor and adapted to single score said blank along the juncture of said bottom flap with said main panel, said first and second scoring means, folding blade sets, and flap guiding bars and third scoring means being disposed in spaced apart sequence along the path of said blank conveyor whereby as said blank is conveyed along said frame it is continuously and in sequence scored and folded to produce a finished gusset-type expansible envelope.

11. An apparatus as claimed in claim 10, wherein said first scoring means comprises two spaced apart sets of three scoring disks mounted on a common shaft, adjustable means between said shaft and disks whereby the spacing between said opposed sets may be varied, a pressure roller having at least a coating of resilient material mounted in parallel alignment beneath and in engagement with said scoring disks.

12. An apparatus as claimed in claim 10, wherein said second scoring means comprises a pair of scoring blade supporting members of arcuate segmental conformation mounted on a common shaft, a set of three spaced apart scoring blades mounted on one of said supporting members in axial alignment with said shaft, a further pair of opposed scoring blades mounted in parallel spaced apart relationship on the other of said members and in axial alignment with said shaft, said supporting members being mounted for pivotal movement on said shaft whereby the circumferential spacing between said set of blades and pair of blades may be varied, and a pressure roller having at least a coating of resilient material mounted in parallel alignment beneath and in operative engagement with said scoring blades.

13. An apparatus as claimed in claim 10, wherein said third scoring means comprises a scoring blade mounted on and in axial alignment with a rocker shaft disposed adjacent one terminal end of said conveyor path.

14. A method of automatically and continuously scoring and folding gusset-type expansible envelope blanks having a front panel, integral top and bottom flap portions and side flap portions extending from each side of said front panel, characterized by the steps of continuously feeding said blanks in spaced apart sequence along a predetermined path, subjecting each of said travelling blanks to a first operation triple scoring said blank longitudinally at each side and in the feeding direction, a second operation scoring said blank adjacent the bottom flap and adjacent the top flap transverse to the feeding direction, subjecting said scored blank to a folding operation whereby said blank triple scored side portions are progressively folded inwardly, outwardly and inwardly to produce a double fold at each side of said blank, guiding said blank side portions during said folding operation from a substantially vertical position to an overlapped horizontal position and finally folding said bottom flap into closed contact with said front panel, said first and second scoring operations, and said folding and guiding operations being carried out in step by step sequence during the travel of said blank along said feeding path whereby said blanks are continuously and in sequence scored and folded to produce a finished gusset-type expansible envelope.

15. A method of automatically and continuously scoring and folding gusset-type expansible envelope blanks having a front panel, integral top and bottom flap portions and side flap portions extending from each side of said front panel, characterized by the steps of continuously feeding said blanks in spaced apart sequence along a predetermined path, subjecting each of said travelling blanks to a first operation triple scoring said blank longitudinally at each side and in the feeding direction, a second operation triple scoring said blank adjacent the bottom flap and double scoring said blank adjacent the top flap transverse to the feeding direction, subjecting said scored blank to a folding operation whereby said blank triple scored side portions are progressively folded inwardly, outwardly and inwardly to produce a double fold at each side of said blank, guiding said blank side portions during said folding operation from a substantially vertical position to an overlapped horizontal position and finally folding said bottom flap into closed contact with said front panel, said first and second scoring operations, and said folding and guiding operations being carried out in step by step sequence during the travel of said blank along said feeding path whereby said blanks are continuously and in sequence scored and folded to produce a finished gusset-type expansible envelope.

16. A method of automatically and continuously scoring and folding gusset-type expansible envelope blanks having a front panel, integral top and bottom flap portions and side flap portions extending from each side of said front panel, characterized by the steps of continuously feeding said blanks in spaced apart sequence along a predetermined path, subjecting each of said travelling blanks to a first operation triple scoring said blank longitudinally at each side and in the feeding direction, a second operation double scoring said blank adjacent the top flap and single scoring said blank adjacent the bottom flap transverse to the feeding direction, subjecting said scored blank to a folding operation whereby said blank triple scored side portions are progressively folded inwardly, outwardly and inwardly to produce a double fold at each side of said blank, guiding said blank side portions during said folding operation from a substantially vertical position to an overlapped horizontal position, and finally subjecting said blank to a third scoring operation scoring said blank along the juncture of said bottom flap with said front panel and folding said bottom flap into closed contact with said front panel, said first and second scoring operations, said folding and guiding operations and said third scoring operation being carried out in step by step sequence during the travel of said blank along said feeding path whereby said blanks are continuously and in sequence scored and folded to produce a finished gusset-type expansible envelope.

17. A method of automatically and continuously scoring and folding gusset-type expansible envelope blanks having a front panel, an integral top flap portion including side gusset portions, a bottom flap portion, and side flap portions extending from each side of said front panel, characterized by the steps of continuously feeding said blanks in spaced apart sequence along a predetermined path, subjecting each of said travelling blanks to a first operation triple scoring said blank longitudinally at each side and in the feeding direction, a second operation double scoring said blank adjacent the top flap, diagonally scoring said flap side gusset portions and single scoring said blank adjacent the bottom flap transverse to the feeding direction, subjecting said scored blank to a folding operation whereby said blank triple scored side portions are progressively folded inwardly, outwardly and inwardly to produce a double fold at each side of said blank, guiding said blank side portions during said folding operation from a substantially vertical position to an overlapped horizontal position, and finally subjecting said blank to a third scoring operation scoring said blank along the juncture of said bottom flap with said front panel and folding said bottom flap into closed contact with said front panel, said first and second scoring operations, said folding and guiding operations and said third scoring operation being carried out in step by step sequence during the travel of said blank along said feeding path whereby said blanks are continuously and in sequence scored and folded to produce a finished gusset-type expansible envelope.

18. A method of automatically and continuously scoring and folding gusset-type expansible envelope blanks having a front panel, an integral top portion including side gusset portions and bottom flap portions and side flap portions extending from each side of said front panel, characterized by the steps of continuously feeding said blanks in spaced apart sequence along a predetermined path, subjecting each of said travelling blanks to a first operation triple scoring said blank longitudinally at each side and in the feeding direction, a second operation triple scoring said blank adjacent the bottom flap, diagonally scoring said top flap side gusset portions and double scoring said blank adjacent the top flap transverse to the feeding direction, subjecting said scored blank to a folding operation whereby said blank triple scored side portions are progressively folded inwardly, outwardly and inwardly to produce a double fold at each side of said blank, guiding said blank side portions during said folding operation from a substantially vertical position to an overlapped horizontal position and finally folding said bottom flap into closed contact with said front panel, said first and second scoring operations, and said folding and guiding operations being carried out in step by step sequence during the travel of said blank along said feeding path whereby said blanks are continuously and in sequence scored and folded to produce a finished gusset-type expansible envelope.

19. In combination with a standard open end envelope machine having a supporting frame, a continuous conveyor adapted to convey envelope blanks along the length of the frame, and adhesive applying means mounted in spaced apart relationship on said frame in the path of said conveyor; apparatus adapted to score and fold up an envelope blank having a front panel, integral top and bottom flap portions and side flap portions extending from each side of the front panel portion, said apparatus comprising a first blank scoring means mounted on said frame transversely and at each side of said conveyor path and adapted to triple score said blank longitudinally at each side in alignment with said conveyor path, a second blank scoring means mounted on said frame transversely of said conveyor path in spaced relationship from said first scoring means and adapted to double score said top flap and single score said bottom flap transversely to said conveyor path, a pair of spaced apart folding blade sets mounted on said frame in alignment with and at each side of the path of said conveyor and being adapted to fold a double fold in each side of said blank as conveyed therebetween, and spaced apart blank guiding means mounted on said frame in alignment and co-operating with said folding blade sets and being adapted to guide said blank side flap portions during said folding operation, and a third blank scoring means mounted on said frame transversely of said conveyor and being adapted to single score said blank along the juncture of said blank bottom flap and front panel, said first and second scoring means, folding blade sets, blank guiding means and third scoring means being respectively disposed in spaced apart relationship along the path of said conveyor whereby as envelope blanks are conveyed along said frame they are continuously and in sequence scored and folded to provide finished guest type envelopes.

20. The combination, as claimed in claim 19, wherein said first scoring means comprises spaced apart sets of three scoring disks mounted on a common shaft and means for adjusting the spacing between said sets of disks.

21. The combination, as claimed in claim 19, wherein said second scoring means comprises a pair of scoring blade supporting members of segmented arcuate conformation mounted on a common shaft extending across said frame, one of said supporting members having a spaced apart pair of scoring blades with the other of said members having a single scoring blade, said supporting members being mounted for circumferential movement on said shaft relative to each other whereby the circumferential spacing between said pair of blades and single blade may be varied.

22. The combination, as claimed in claim 19, wherein said third blank scoring means comprised a single scoring blade mounted on a rocker shaft disposed adjacent to one terminal end of the path of said conveyor.

23. The combination, as claimed in claim 19, wherein each of said folding blade sets comprises elongated opposed main blank guiding and forming members mounted on said frame in parallel spaced apart relationship, each of said main blank forming members having inwardly extending fold forming blade portions of varying lengths disposed along the length of the member in spaced apart staggered relationship one above the other with the blade portions of one member interleaved with the blade portions of the other member.

24. An apparatus adapted to automatically fold and make-up a gusset type envelope from an envelope blank having a front panel, integral top and bottom flap portions and side flap portions extending from each side of the front panel portion, and in combination with a standard automatic open end envelope machine having a supporting frame, a continuous conveyor adapted to convey said blanks along the length of said frame and adhesive applying means disposed on said frame along the length of said blank conveying path; comprising, a first adjustable bank scoring means mounted on said machine frame across said conveyor and adapted to triple score said blank side flap portions at each side of said front panel in alignment with the conveying direction, a second adjustable scoring means mounted on said frame adapted to single score said blank adjacent the juncture of the bottom flap with the front panel and double score the top flap adjacent the juncture with the front panel transversely to the path of said conveyor, a pair of spaced apart folding blade sets mounted on said frame at each side of said conveyor path adapted to fold said double scored side flap portions, inwardly, outwardly and inwardly in sequence to produce a double fold at each side of said blank, a pair of opposed blank guiding bars mounted on said frame and adapted to co-operate with said folding blade sets to guide the free portions of said blank side flaps in a substantially vertical position as they pass through said folding blade sets and finally guide said flaps into overlapped position on said blank front panel, and a third scoring means mounted on said frame transversely to said conveyor and adapted to single score said blank along the juncture of said bottom flap with said main panel, said first and second scoring means, folding blade sets, flap guiding bars and third scoring means being disposed in spaced apart sequence along the path of said blank conveyor whereby as said blank is conveyed along said frame it is continuously and in sequence scored and folded to produce a finished gusset type envelope.

25. An apparatus as claimed in claim 24, wherein said first scoring means comprises two spaced apart sets of three scoring disks mounted on a common shaft, adjustable means between said shaft and disks whereby the spacing between said opposed sets may be varied, a pressure roller having at least a coating of resilient material mounted in parallel alignment beneath and in engagement with said scoring disks.

26. An apparatus as claimed in claim 24, wherein said second scoring means comprises a pair of scoring blade supporting members of arcuate segmental conformation mounted on a common shaft, a single scoring blade mounted on one of said supporting members in axial alignment with said shaft, a pair of opposed scoring blades mounted in parallel spaced apart relationship on the other of said members and in axial alignment with said shaft, said supporting members being mounted for pivotal movement on said shaft whereby the circumferential spacing between said pair of blades and single blade may be varied, and a pressure roller having at least a coating of resilient material mounted in parallel alignment beneath and in operative engagement with said scoring blades.

27. An apparatus as claimed in claim 24, wherein said third scoring means comprises a scoring blade mounted on and in axial alignment with a rocker shaft disposed adjacent one terminal end of said conveyor path.

28. A method of automatically and continuously scoring and folding gusset type envelope blanks having a front panel, integral top and bottom flap portions and side flap portions extending from each side of said front panel, characterized by the steps of continuously feeding said blanks in spaced apart sequence along a predetermined path, subjecting each of said travelling blanks to a first operation triple scoring said blank longitudinally at each side and in the feeding direction, a second operation double scoring said blank adjacent the top flap and single scoring said blank adjacent the bottom flap transverse to the feeding direction, subjecting said scored blank to a folding operation whereby said blank triple scored side portions are progressively folded inwardly, outwardly and inwardly to produce a double fold at each side of said blank, guiding said blank side portions during said folding operation from a substantially vertical position to an overlapped horizontal position, and finally subjecting said blank to a third scoring operation scoring said blank along the juncture of said bottom flap with said front panel and folding said bottom flap into closed contact with said front panel, said first and second scoring operations, said folding and guiding operations and said third scoring operation being carried out in step by step sequence during the travel of said blank along said feeding path whereby said blanks are continuously and in sequence scored and folded to produce a finished gusset type envelope.

References Cited in the file of this patent

UNITED STATES PATENTS

| | | |
|---|---|---|
| 425,524 | Purvis | Sept 2, 1890 |
| 1,753,354 | Stickney | Apr. 8, 1930 |
| 1,839,492 | Novick | Jan. 5, 1932 |
| 1,887,680 | Hallman | Nov. 15, 1932 |
| 2,063,392 | McCain | Dec. 8, 1936 |
| 2,098,970 | Novick | Nov. 16, 1937 |
| 2,123,548 | Sauerman | July 12, 1938 |

UNITED STATES PATENT OFFICE

CERTIFICATE OF CORRECTION

Patent No. 2,899,874                                         August 18, 1959

William O. Normandin

It is hereby certified that error appears in the above numbered patent requiring correction and that the said Letters Patent should read as corrected below.

In the grant, lines 1 to 3, for "William O. Normandin, of Montreal, Quebec, Canada," read -- William O. Normandin, of Montreal, Quebec, Canada, assignor to Canada Envelope Company, of Montreal, Quebec, Canada, --; line 12, for "William O. Normandin, his heirs" read -- Canada Envelope Company, its successors --; in the heading to the printed specification, line 3, for "William O. Normandin, Montreal, Quebec, Canada" read -- William O. Normandin, Montreal, Quebec, Canada, assignor to Canada Envelope Company, Montreal, Quebec, Canada --.

Signed and sealed this 26th day of January 1960.

(SEAL)
Attest:
KARL H. AXLINE

Attesting Officer

ROBERT C. WATSON
Commissioner of Patents